Nov. 27, 1962 — C. K. STEDMAN — 3,065,639
MOTION SENSING DEVICE
Filed July 10, 1959 — 8 Sheets-Sheet 1

INVENTOR.
CECIL K. STEDMAN
BY Philip Subkow
ATTORNEY

Nov. 27, 1962

C. K. STEDMAN 3,065,639

MOTION SENSING DEVICE

Filed July 10, 1959

INVENTOR.
CECIL K. STEDMAN
BY Philip Subkow
ATTORNEY

Nov. 27, 1962  C. K. STEDMAN  3,065,639
MOTION SENSING DEVICE
Filed July 10, 1959  8 Sheets-Sheet 4

INVENTOR.
CECIL K. STEDMAN
BY
ATTORNEY

Nov. 27, 1962

C. K. STEDMAN 3,065,639

MOTION SENSING DEVICE

Filed July 10, 1959

INVENTOR.
CECIL K. STEDMAN
BY
ATTORNEY

United States Patent Office 3,065,639
Patented Nov. 27, 1962

3,065,639
MOTION SENSING DEVICE
Cecil K. Stedman, Enumclaw, Wash.
Filed July 10, 1959, Ser. No. 826,325
24 Claims. (Cl. 73—515)

This invention relates to motion sensing devices and particularly to linear accelerometers in which a solid mass is suspended on a yieldable constraint and is immersed in a damping liquid.

This invention relates to improvements in such system. This application is a continuation-in-part of application Serial No. 637,750, filed February 1, 1957, now abandoned, which in turn is a continuation-in-part of application Serial No. 577,707, filed April 12, 1956, now patent Serial No. 2,946,225.

In my invention the mass of the suspended member, i.e., its mass in air, corrected for the buoyancy of the mass in the liquid, determines the range of the instrument for any given constraint. This mass, corrected for buoyancy will hereafter be referred to as the "suspended mass." In my invention the suspended mass contributes in but a minor degree to the mass of dynamic system which governs the natural frequency of the system. In my invention the body of liquid in which the suspended member is immersed contributes in a major degree to this mass which will hereinafter be referred to as the dynamic mass. In a preferred embodiment, I design the instrument so that the contribution of the suspended mass to the entire dynamic mass of the dynamic system is so small as to become practically unsubstantial. This occurs when the suspended solid mass contributes 10% or less and preferably not more than about 5% of the dynamic mass of the dynamic system.

When the case is subjected to vibratory motion, the liquid moves in oscillatory flow from one side of the suspended mass to the other side of the suspended mass. The inertia, of the system of my invention, when subjected to oscillatory motion, is in major proportion and preferably to the degree previously described, governed by the inertia of the body of liquid moving in oscillatory flow. It may thus decrease the natural frequency without increasing the size of the mass and I can also obtain the desired damping characteristics and the desired response characteristics of the damped system.

I attain the above objects of my invention by a suitable arrangement and design of the flow channels of the liquid. By such design I may adjust the range and the natural frequency of the system substantially independently of each other. I may also obtain, in this way, desirable damping characteristics.

The flow channels are designed to provide parallel liquid flow passageways.

By properly designing these flow passageways the instrument of my invention will exhibit the phenomenon of minimum damping. The damping ratio in the systems of my invention are governed by the viscosity of the liquid and therefore the damping ratio is temperature sensitive. In the system of my invention the damping ratio decreases with decrease in viscosity and then passes through a minimum and then increases. The damping ratio may be made to vary, in the region of the minimum damping, in an unsubstantial amount. Thus in this region of viscosities, the damping ratio remains substantially constant over a wide range of changes in viscosity or temperature. The systems of my invention may be, to the degree desired, substantially insensitive to temperature variations over a chosen range of temperatures.

In a preferred embodiment I suspend the solid member on a frame by a yieldable constraint. The solid is immersed in the damping liquid. The suspended mass is positioned so that the liquid flows from one side of the mass to the other side of the mass and over the mass from one side to the other side. In flowing over the mass it passes through a restricted orifice.

In one embodiment of my invention I provide a case. The solid is suspended in the case and spaced from a wall surface. The space between the wall and the solid forms a peripheral orifice or gap which provides the restricted orifice.

I provide an additional conduit or conduits, hereinafter referred to as auxiliary passageways, so that liquid flow may occur through these auxiliary passageways as well as through the restricted orifice. The flow through the orifice and through the auxiliary passageways are in parallel.

The mass may thus be viewed as a spring mounted piston which pumps liquid when it moves relative to the case. The liquid moves through the parallel passageways formed by the restricted orifice and the auxiliary passageway.

By a proper design of the dimensions of the mass, spring suspension, restricted orifice and auxiliary passageways, in relation to the characteristics of the solid and choice of the liquid employed, I obtain the above results.

As is well known the natural frequency of an undamped mass suspended on a spring restraint is given by the following relationships:

$$w_n = 2\pi f_n = \left(\frac{K}{M}\right)^{1/2} \quad (1)$$

where $w_n$ is the angular natural frequency in radians per second, $f_n$ is the natural frequency in oscillation per second, K is the spring constant of the constraint and M is the mass. This mass is herein referred to as the suspended mass of the system.

When such a mass undergoes forced vibration by a sinusoidally applied force, the displacement increases as the frequency increases and approaches infinity as the applied frequency approaches the above natural frequency. At this frequency the response of the mass to the applied sinusoidal force has fallen 90°, i.e., a quarter wave length behind the sinusoidal input variations, i.e., a phase shift of 90° has occurred. This frequency may thus be named the undamped natural frequency.

In order to limit the displacement, a damping force is employed. Thus, for example, a liquid dashpot is associated with the mass to introduce a restraining or damping force.

In this specification the frequency of the damped system at which the phase shift is 90° will be referred to as the natural frequency ($f_n$).

If it be desired in the prior art systems to produce an instrument of low natural frequency the mass must be increased or the stiffness decreased. This results in an increase in the static deflection and decrease in the range and an increase in the size of the instrument.

I have found that I may obtain the desired reduction in the natural frequency and still obtain the desired damping ratio to provide desirable frequency response characteristics without appreciably increasing the size of the instrument by the provision of the auxiliary orifices of the kind referred to above.

By properly proportioning the dimensions of the restricted orifice and auxiliary passageway, for any design of a damped system of the character described in this application, I may make the impedance to flow of the liquid in the restricted orifice or auxiliary passageway or both either primarily resistive or primarily inertial and so obtain the desired damping and damped natural frequency and response characteristics.

In a preferred embodiment of my invention, I proportion the orifices and passageways so as to make the flow impedance in the restricted orifice primarily resistive and the flow impedance in the auxiliary orifices primarily inertial, although I may make the restricted orifice either inertial or resistive in character and also may make the auxiliary passageway either inertial or resistive in character by the proper proportioning of parts.

This invention will be further described by reference to the figures of which:

Figure 11:
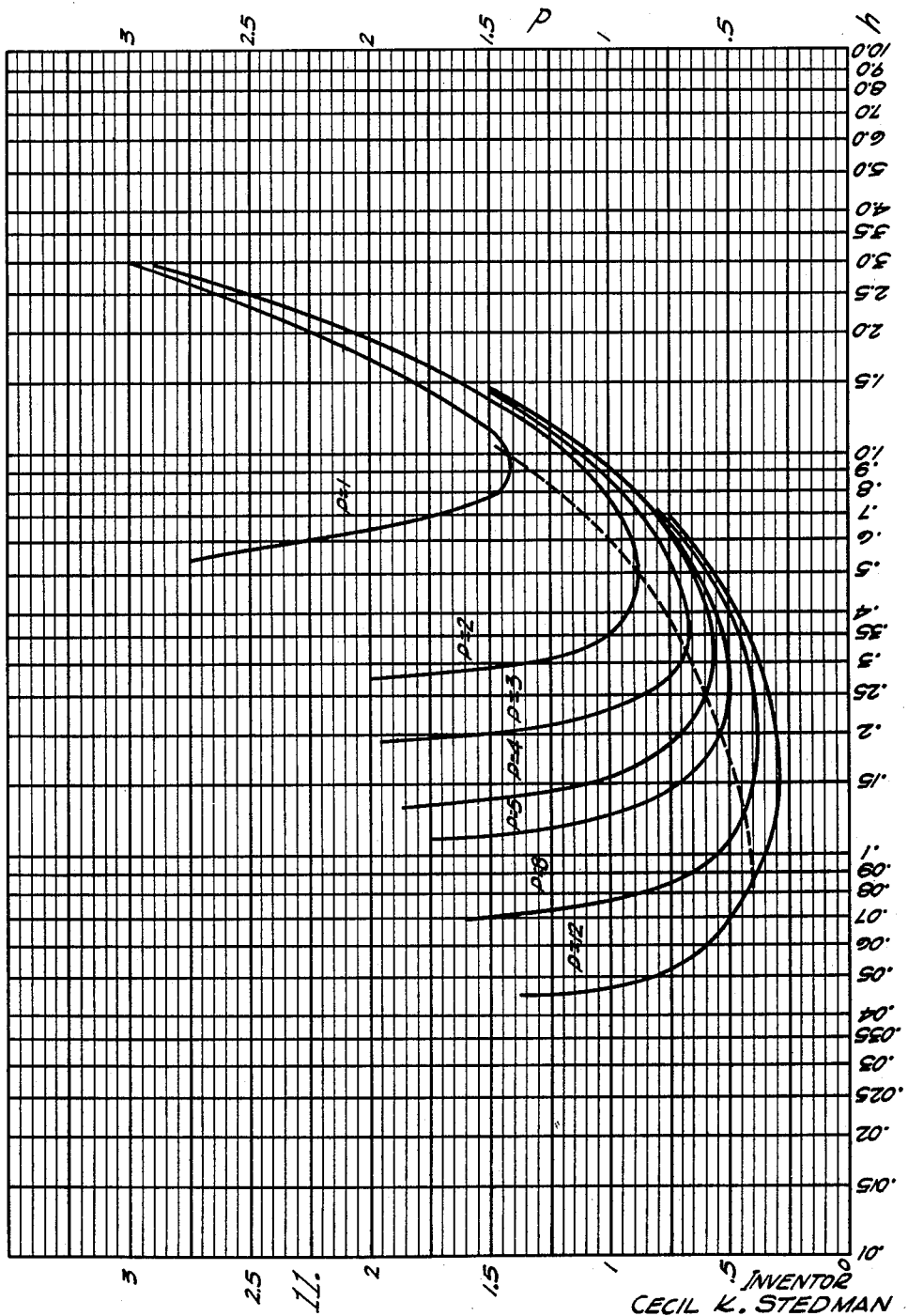
Figure 12:
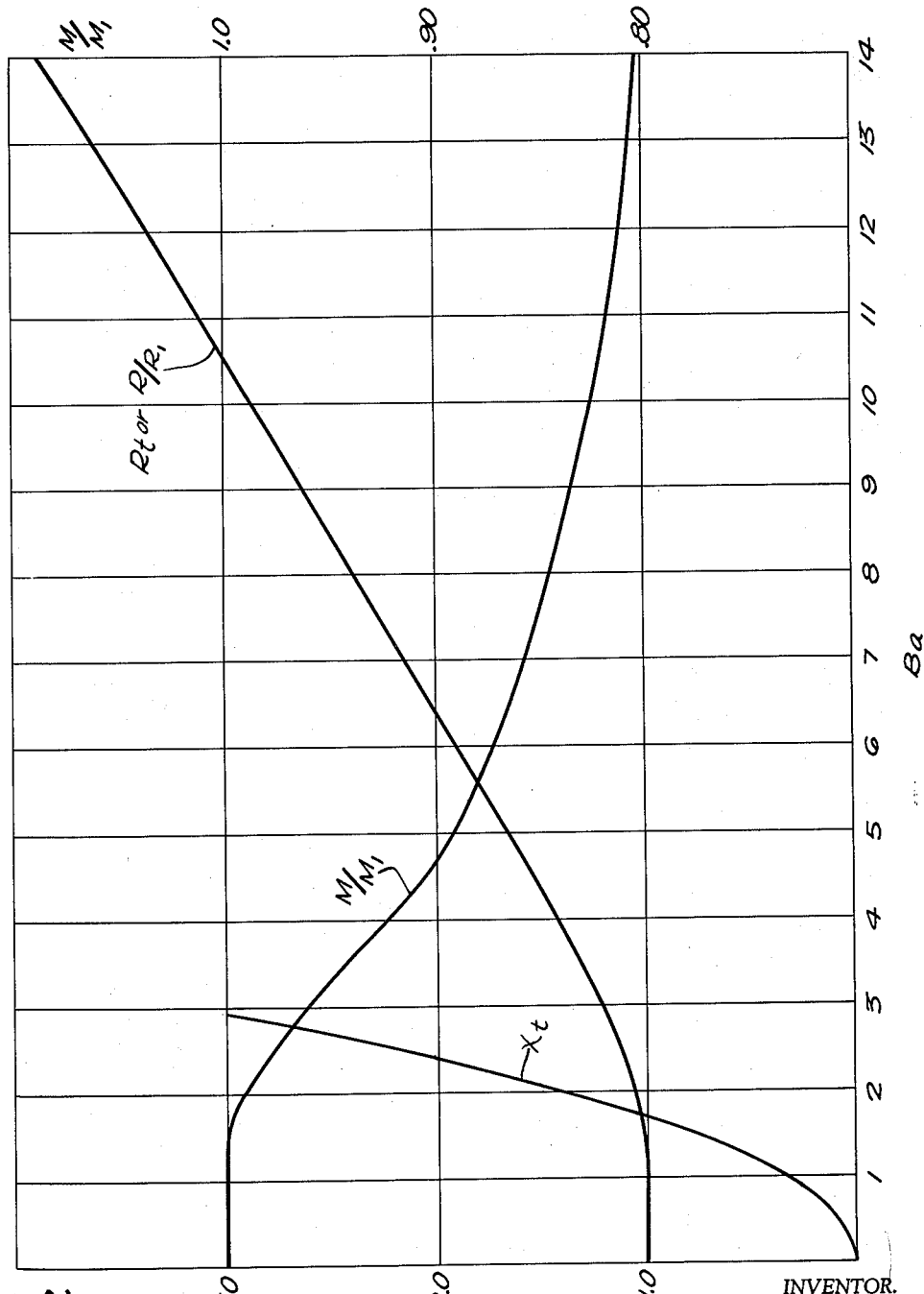
Figure 13:
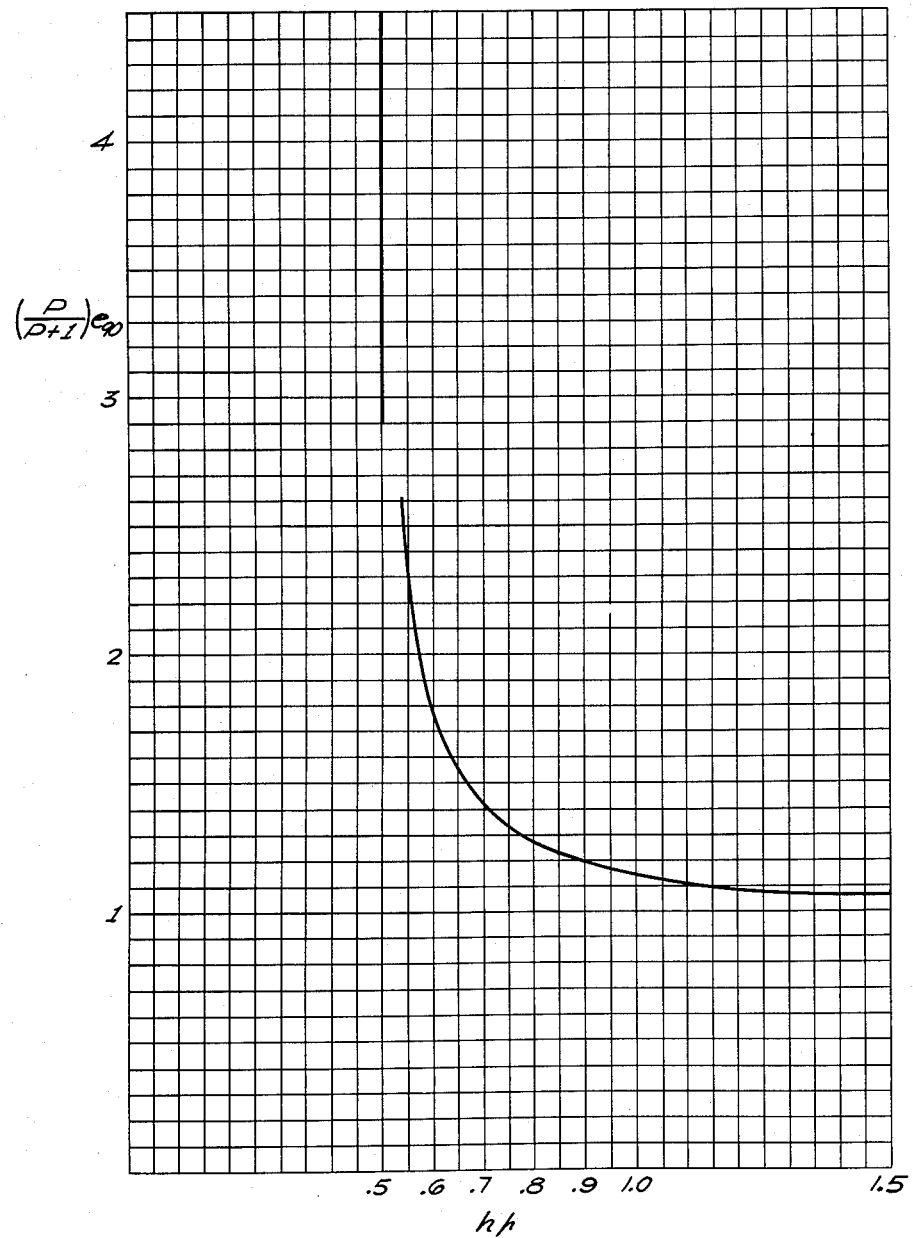

FIGS. 11, 12, and 13 are charts illustrating the principle of my invention.

The accelerometer as shown in FIGS. 1 to 5 constitutes modifications of the accelerometer shown in the Statham Patent No. 2,453,548 and varies therefrom in that the frame of the accelerometer is positioned in the case so that liquid in the case cannot circulate freely around the mass and frame from one side of the seismic mass to the other side of the seismic mass, but is directed to flow in a defined channel such that the flow resistance can be controlled.

In FIGS. 1 to 5 the case 1 is covered by a vented cover 2 containing a diaphragm chamber 3, a diaphragm 4 and a vented bottom 5. Spaced from the top 6 of the case 1 is a circumferential internal shoulder 7, 8, 9 and 10 around the four sides of the rectangular case 1. The frame 11 of the accelerometer is composed of a U-shaped frame, having a base 11a and two legs 11b and 11c. The base is slotted to provide two lips 11d and 11e, stop screws being provided in these lips.

The solid 15 is stepped at 15a to receive a spring 16, which is clamped in the step 15a by a clamping block 16a. The other end of the flat spring 16 is clamped by clamping block 18 to clamping block 19, and 18 is connected to the ends of the legs 11b and 11c. This construction provides a rectangular opening in which the rectangular solid 15 is suspended on the spring 16. The peripheral edges of said solid are spaced from the frame on three sides of the solid, the fourth being closed by the spring 16, to give a restricted orifice in the form of a gap 20. This gap forms the orifice referred to above, and for a more particular description may be termed the paddle orifice, since on oscillation of the mass 15 on the spring 16, the mass has the properties of a suspended paddle.

The frame 11 is seated on the shoulder 7, 8, 9 and 10 so as to make a tight seal around the entire periphery of the case 1. The case is thus divided into two chambers 21 and 22. The electrical resistance strain wires 23 are positioned in chamber 21 and stretched in tension between pins 24, and the strain wires 25 are positioned in chamber 22 and stretched in tension between the pins 24', and are connected to terminals 23' and 25', as is conventional for such strain wire devices (see Statham Patent No. 2,453,548).

However, in order to provide the flow paths whose functions have been described above and which will be more fully described below, I provide a flow channel in addition to that through the orifice 20. This auxiliary passageway may be provided, as in FIGS. 1 to 3, by the tubular ports 26 and 27 of uniform cross-section bored through the legs 11b and 11c. In the form shown in FIG. 5 in which illustration only the frame is shown, the mass assembly which may be used is the same as that of FIG. 1, the passageways 26 and 27 are replaced by elongated slots 28 and 29 through the legs 11b and 11c, with parallel walls 30 and 31 in slot 28 and parallel walls 32 and 32' in slot 29. The slots and the peripheral length of the paddle orifice are of such length in relation to the width of the slots and the orifice that the flow inductances on oscillatory motion are governed by the width of the slots as will be more fully described below.

Figure 3:
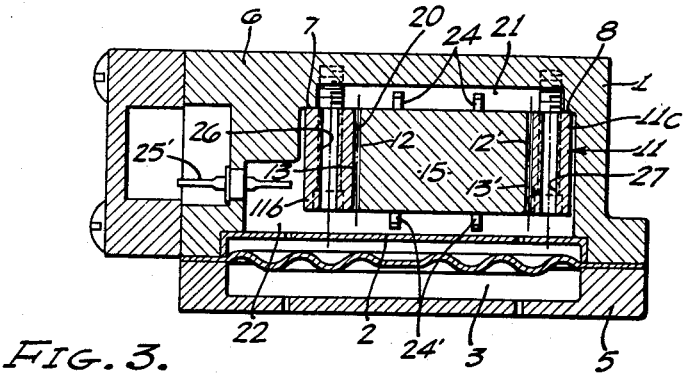
FIG. 3 is a section taken on line 3—3 of FIG. 2.
Figure 5:
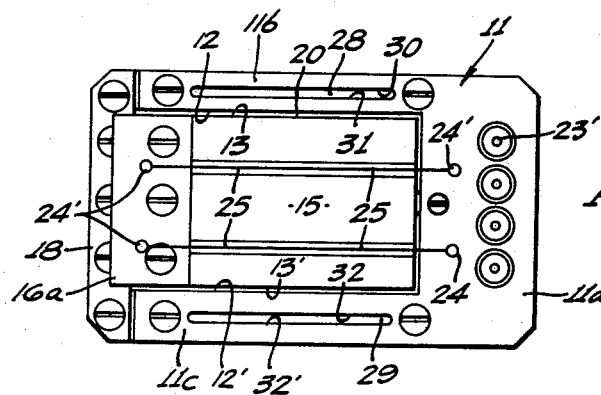
FIG. 5 is a further modification of the accelerometer of my invention.
Figure 4A:
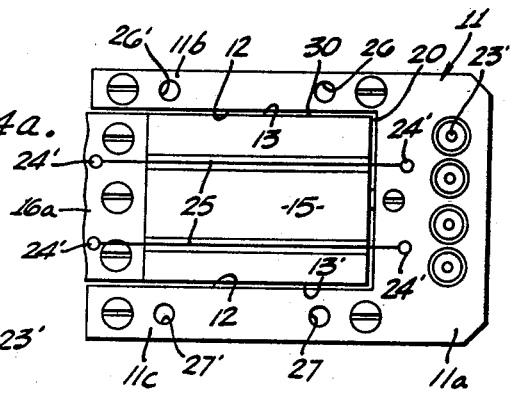
FIG. 4a shows a further modification of the device shown in FIGS. 1 to 3.
Figure 4:
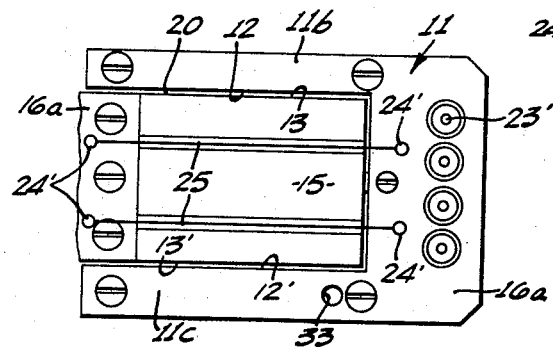
FIG. 4 shows a modification of the device shown in FIGS. 1 to 3.

The form shown in FIG. 4 is a modification of FIG. 3, using only one bore 33, such as 26 or 27. The bore 33 may, however, be replaced by a slot, such as shown in FIG. 5.

While I have shown only one bore or one slot in each leg of FIGS. 1 to 3 and FIG. 5, I may use a plurality of such bores or slots in one or both legs. Thus in FIG. 4a is shown at 26, 26', 27 and 27' a plurality of such bores in each leg of the frame. The geometry of the slot or bore may be varied from the rectangular or circular bores as desired.

The case 1, chambers 21 and 22, and the space above the diaphragm 4 and bottom 2, provided with suitable vent ports, are filled with a liquid of desired viscosity, while chamber 3 is open to ambient pressure.

Figure 1:
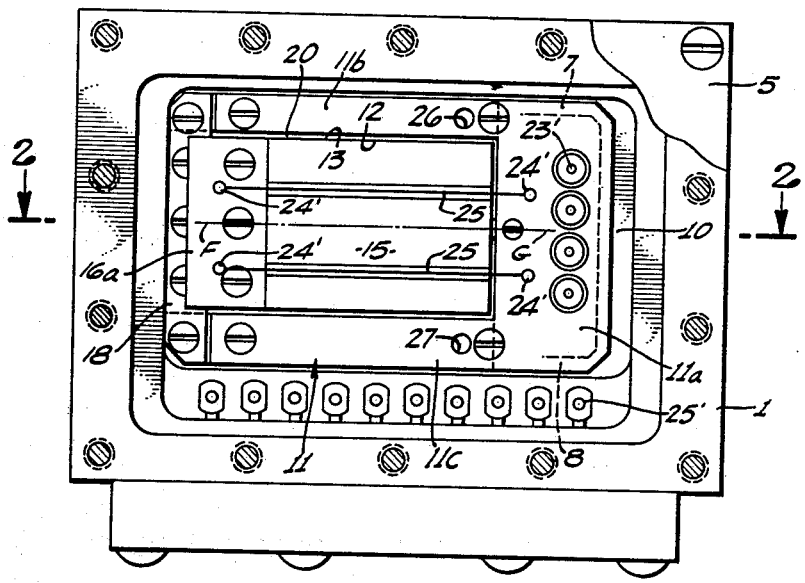
FIG. 1 is a plan view of one form of the linear accelerometer of my invention.
Figure 2:
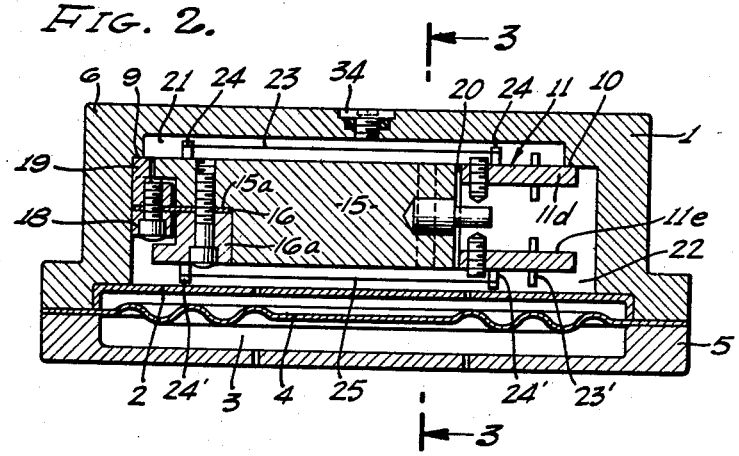
FIG. 2 is a section taken on line 2—2 of FIG. 1.

It will be seen in the form of FIGS. 1 to 3 that the only liquid communication between the chambers 21 and 22 is via the ports 26 and 27 and through the peripheral orifice 20 between the periphery of the mass and the frame. The mass 15 has a top and bottom surface and may be termed a paddle mounted to deflect angularly on the spring 16, which acts as a hinge. The spring and the electrical resistance strain wires described below act as the constraint upon the paddle.

While the mass 15 is shown as solid, it may be made hollow to reduce its mass and increase its buoyancy. Its effective suspended mass may be made as small as desired or may be made negative, i.e., less than the mass of the liquid displaced by the solid mass. In like manner the material of the solid may be chosen so that its density shall have the desired relation to the density of the liquid. Thus it may be made of metal or of non-metallic material of desired density.

In the structures of FIGS. 1 to 5, on linear acceleration of the case, the fluid moves with the case, and in the auxiliary passageways 26 and 27 (FIG. 1), 28 and 29 of FIG. 5, and 33 of FIG. 4, and 26, 26', 27 and 27' of FIG. 4a, and is given a like acceleration. Consequently, no difference in pressure is developed on the opposite sides of the mass 15 due to accelerated liquid motion, and no torque occurs to deflect the paddle 15 as a result of the acceleration of the fluid. If the paddle 15 has residual mass, i.e., if it not be made exactly buoyant, it will deflect on the spring 16. Its range, i.e., the magnitude of its deflection under constant linear acceleration in one direction, is dependent substantially entirely on the inertia of the paddle 15 when immersed in the liquid and upon the stiffness of the constraint on the paddle and independent of the inertia of the liquid.

However, if the case is subject to change in acceleration as, for example, when subjected to oscillatory linear movement, the paddle 15 will oscillate on its spring suspension, causing movement of fluid relative to the case from one chamber 21 to the other chamber 22. This flow in the device of FIGS. 1 to 5 is in parallel flow through the ports 26 and 27 in FIG. 1, or 26, 26', 27 and 27' in FIG. 4a, or 33 in FIG. 4, or 28 and 29 in FIG. 5, and through the paddle orifice 20.

Figure 7:
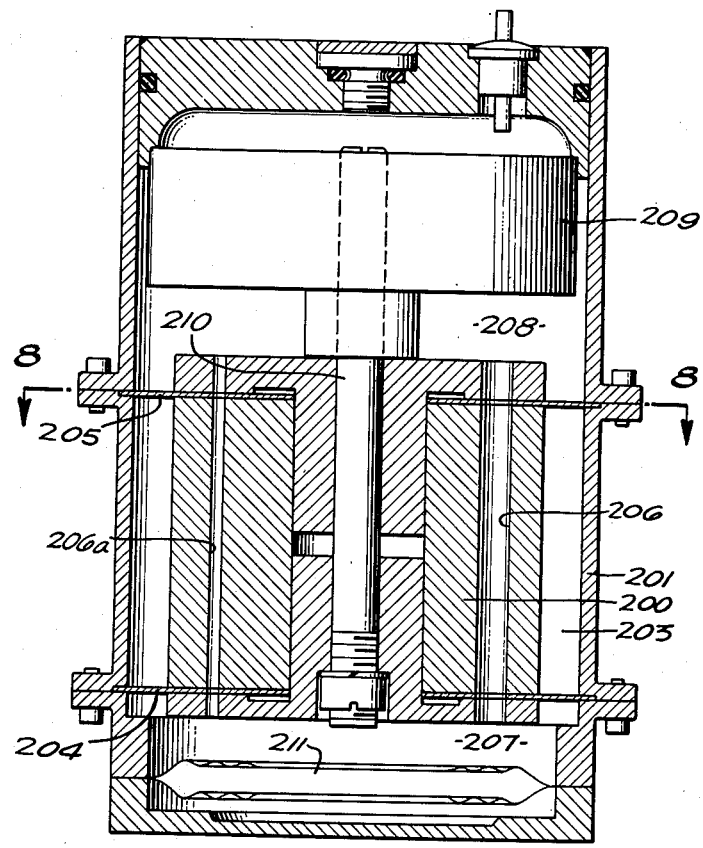
FIG. 7 is a vertical section of another form of my invention.
Figure 8:
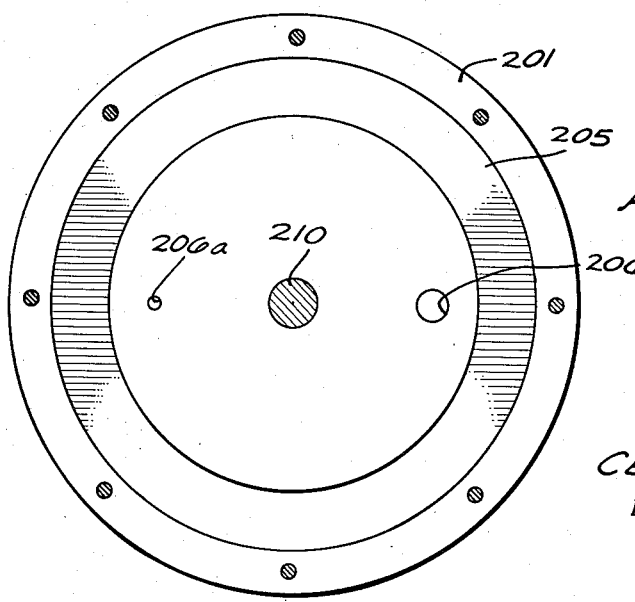
FIG. 8 is a section on line 8—8 of FIG. 9.

In FIG. 7, the restricted orifice and the auxiliary passageways are formed in the piston. As shown the mass 200 is mounted on two imperforate annular diaphragms 204 and 205 which are clamped to the mass 200 and the case 201, forming two chambers 207 and 208. The mass is connected to a transducer 209 for measuring the oscillatory movement of a mass such as is employed in accelerometers. The chamber 207 carries a flexible capsule 211 sealed at the edges to form a flexible air chamber. The mass carries a restricted orifice 206a and an auxiliary passageway 206 which are of desired cross-section, for example, circular and which connect chambers 207 and 208. The case is filled with oil which fills chambers 207 and 208 and the restricted orifice 206a and passageway 206.

Figure 9:
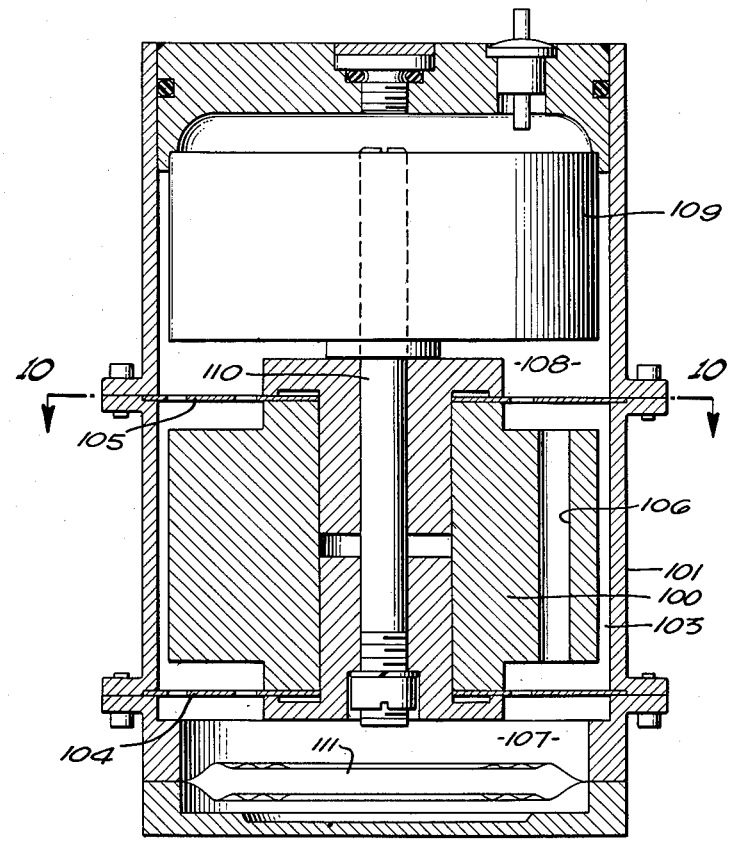
FIG. 9 is a vertical section of another form of my invention.
Figure 10:
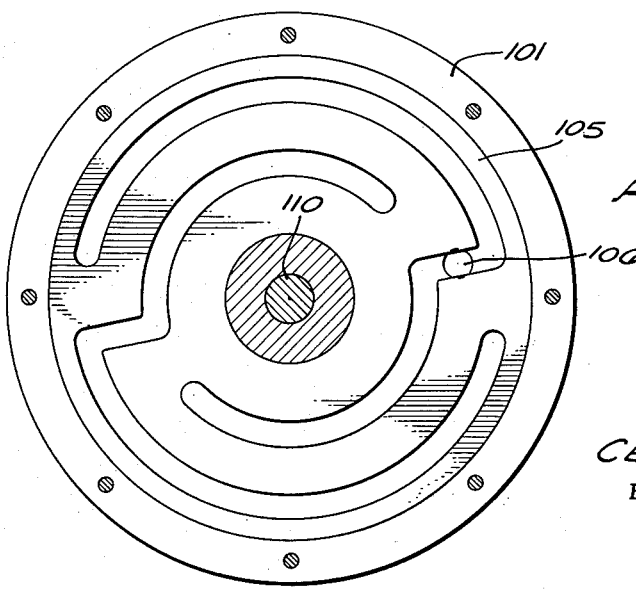
FIG. 10 is a section on line 10—10 of FIG. 9.

FIGS. 9 and 10 illustrate another form of an accelerometer.

In this form the mass 100 is suspended inside a case 101 to leave an annular gap 103 between the peripheral cylinderical surface of 100 and the case 101. The mass 100 is suspended on flat springs 104 and 105. The mass has an auxiliary hole 106 passing through the mass and communicating with space 107 and 108. The mass is connected to a transducer such as an unbonded strain gage 109 by rod 110. I may use any form of transducer for measuring the oscillating movement of a mass such as is employed in an accelerometer. The flexible capsule 111 is positioned in the case made up of two flexible diaphragms sealed at their edges to form an air chamber. The case is filled with oil at the appropriate viscosity. On oscillatory movement of the case 101, the case moves with respect to the mass and oil moves in the passageway 106 and 107 and 108 and in the restricted orifice as in the form of the peripheral gap 103.

More than one restricted orifice and more than one auxiliary passageway may be provided in the forms of FIGS. 7–10 and the shape may be other than circular as described above.

I have found in the above systems in which the auxiliary passageway is a circular tube and others of similar dynamical characteristics that one of the parameters that defines the response of the system is a parameter $f_0$ having the dimensions of a frequency and which may be defined by the following equation $$f_0 = \frac{1}{2\pi A}\left[\frac{3\pi a^2 K'}{5rL}\right]^{1/2} \quad (2)$$

where $a$ in centimeters is the radius of the auxiliary tubular passageway of circular cross-section. The letter $r$ is the density of the liquid, L is the length of the auxiliary passageway in centimeters and where A is the effective area defined as $$A = \frac{V}{x} \quad (2a)$$

where V is the volume in cubic centimeters displaced by the paddle or mass 15 of FIGS. 1–5 or mass 100 or 200 of FIGS. 7–10 upon any displacement $x$ in centimeters of the mass. For the systems of FIGS. 1–5, $$A = \frac{F}{2}$$

where F is the area of one side of the paddle (both sides being of equal area) and $l$ is the length measured from the spring end to the free end of the paddle.

In FIGS. 7–10 A is the area of the top circular surface of the mass 100 (both sides being of equal area). K' in the form of FIGS. 7–10 is the Hooke's law constant $K_2$, i.e., the ratio of the force applied to the mass 100 to the displacement $x$. In the form of FIGS. 1–5 it is the torsional spring constant $K_1$ divided by $l^2$ ($K_1/l^2$) all terms being in c.g.s. units.

The impedance to the oscillatory flow in any of the orifices and passageways described above is given by the following relationship $$Z = R + jw\left(\frac{M}{A_t^2}\right) \quad (3)$$

or $$Z = R + jX_t \quad (3a)$$

When Z is the impedance to flow, R is the resistance component of the impedance, $w$ is the angular frequency of oscillatory flow of liquid, where M is the effective mass of the fluid undergoing oscillatory flow in the passageway whose cross-sectional area is $A_t$ and $j$ is $(-1)^{1/2}$. In an analogy to electrical terminology, the imaginary term may be referred to as the reactance and in the case of an incompressible fluid, the term in parentheses in Equation 3 may also be referred to as the inertance. Both M and R vary with the value of $w$. We may express the values of these M and R for very low values of $w$, i.e., as $w$ approaches zero as $M_1$ and $R_1$. The ratio of the values of R and M respectively at any frequency to the values of $R_1$ and $M_1$ respectively depends on the kinematic viscosity of the liquid and upon the value of "$a$" of the passageway through which the liquid flows.

Thus as I have found they depend on the value of a parameter $Ba$ wherein $$B = \left(\frac{w}{2v}\right)^{1/2} \quad (4)$$

where $v$ is the kinematic viscosity. For a tube of circular cross-section of radius "$a$" the value of $R_1$ is given in the following $$R_1 = \frac{8uL}{\pi a^4} \quad (5)$$

In Equation 5 $u$ is the viscosity of the liquid, i.e., $rv$. Where the passageway is not of circular cross-section, $R_1$ may be measured by measuring the viscous flow resistance through the passageway under steady laminar flow at low heads.

The equivalent value of "$a$" for orifices and passageways that are not of circular cross-section may be obtained by measuring the value of the resistive and the reactive component of the impedance of the non-circular tube. The value "$a$" for the non-circular tube herein referred to as the equivalent radius is taken as the radius of a circular tube which has the same ratio of the resistive to the reactive component of the impedance. For a slot with parallel sides or for an annular gap whose radius is large as compared with the width of the annulus it may be taken as substantially equal to about one-half of the separation between the opposing sides and more accurately as two-thirds of the separation, i.e., two-thirds of the annulus or slot width between parallel sides of the slot.

The value of the term $M_1$ may, as I have found, be taken as equal to about 1.2 to 1.3 times the physical mass of the liquid in the passageway. The value of M, at any value of $w$ may be determined by measuring the total impedance to flow, having determined the value of R at such frequency as will be evident from the Equation 3. At high frequencies the value of M may be taken as equal to the physical mass of the liquid in the passageway.

The variation of these ratios ($M/M_1$ and $R/R_1$), as I have found, depends not only on "B" but also on "$a$."

The variation of the ratios $M/M_1$ and $R/R_1$ for passageways of circular cross-section with values of $Ba$ is shown in the curves of FIG. 12.

I have found that in the liquid damped systems of this invention it is desirable that the values of "$a$" times "B" for the auxiliary passageway be greater than 1.22 and up to 4 or more, for example, 6 or 7, to obtain an impedance which is primarily inertial and in the case of the restricted orifice (20 of FIGS. 1–5, 206a of FIG. 7 and 103 of FIG. 9) to hold the value of Ba to equal to or less than 2, for example, $(3)^{1/2}$ or less, in order to maintain the impedance in the restricted orifice primarily resistive. The value B is taken with "$v$" measured in stokes and "$w$" at the frequency at which such control is desired, for example, at the frequencies corresponding to $f_n$ or $f_0$.

The nature of the curves which I have determined and as shown in FIG. 12, indicates that below about 2, the value of $R/R_1$ and $M/M_1$ are substantially constant.

This value is for circular tubes. For slots such as the slotted auxiliary passageway or peripheral gap of FIGS. 1–5 or of the annular gap of FIGS. 9 and 10, as described above the value of B$a$ for such unitary ratio is equal to $$\frac{(5)^{1/2}}{2}$$

On FIGURE 12 is also plotted the variation of the reactance $X_t$ for the circular tube, measured in acoustic ohms, as a function of B$a$. Acoustic ohms is used to measure the impedance to flow of fluids and is defined as the pressure drop per unit flow rate.

The $X_t$ curve is plotted from the following data:

Table 1

| B$a$ | $X_t$ |
|---|---|
| .62 | .13 |
| .87 | .26 |
| 1.23 | .52 |
| 1.73 | 1.04 |
| 2.08 | 1.50 |
| 2.40 | 2.0 |
| 2.94 | 3.0 |

The scale on FIG. 12 (see Table 1) is taken arbitrarily to indicate the relationship between acoustic resistance and acoustic reactance. Thus the scale of ohms is to be multiplied by the value of the resistance of the passageway as actually determined by the method of FIG. 6 as described below. For a circular tube this value is $R_1$ of Equation 5. It will be observed that at a value of B$a$ equals $(3)^{1/2}$, the line of $X_t$ for a circular tube crosses the $R_t$ curve for a circular tube which on the scale indicated is the same as the $R/R_1$ curve.

At the value of B$a$ equals $(3)^{1/2}$ the resistance and reactance are equal. At larger values of B$a$, the impedance may be said to be primarily inertial and at smaller values primarily resistive.

While the exact value of the expression "B$a$" at which the flow becomes inertial will vary with the geometry of the restricted orifice and of the auxiliary flow passageways, it will be found that irrespective of this geometry, the impedance to liquid flow in the passageway is primarily inertial when the value of the expression "B$a$" for such shapes is greater than the values set forth above.

In order to obtain the advantages of my invention in producing a large dynamic mass without using a large static mass, I designed the instrument to include the following principles.

The relative frequency "$e$" at any frequency $f=w/2\pi$ may be expressed as $$e = f/f_0 \qquad (6)$$

For the system of Examples 1–5 "$e$" may also be written $$e = w \left[ \frac{X_t A^2 l^2}{w K_1} \right]^{1/2} \qquad (7)$$

Where $X_t$ is the value of $X_t$ in Equation 3$a$ measured for the auxiliary passageway, and $l$ is the length of the paddle 15 measured from the spring end to the end of the paddle and $K_1$ is the moment of torsion of the constraint, i.e., of the wires and the spring and $w$ is the angular frequency at which X is measured.

A corresponding equation may be written for the forms of FIGS. 7 and 9 as will be evident from Equations 2 and 3 and 3$a$.

The value of $e$ at the natural frequency (i.e., when $w=2\pi f$ and $f$ is the natural frequency $f_n$) is symbolized by $e_{90}$ and is given by $$e_{90} = \frac{2h[p + R/R_1]}{\dfrac{M}{M_1}\left[\left(\dfrac{4p^2h^2M_1}{M}\right) - 1\right]^{1/2}} \qquad (8)$$

where the ratios $R/R_1$ and $M_1/M$ are the values corresponding to the values of B$a$ calculated at the natural frequency $f_n$ and where $$h = \frac{2Au}{a^3}\left[\frac{3L}{\pi r K}\right]^{1/2} \qquad (9)$$

where all symbols have the above meanings with "$a$" referring to the auxiliary passageway and $$p = R_s R_t \qquad (10)$$

For the configurations of FIGURES 1–5, $h$ is also given by the following $$h = \frac{R_t}{2}\left[\frac{A^2 l^2 w}{K_1 X_t}\right]^{1/2} \qquad (11)$$

where $R_s$ is the resistance component of the Equation 3 for the restricted orifice and $R_t$ is the same component for the auxiliary passageways measured as described above and more specifically described below.

Where $R/R_1 \cong 1$ and $M/M_1 \cong 1$ as for the systems described above, i.e., the above expression reduce to $$e_{90} = \frac{2h(p+1)}{[4p^2h^2 - 1]^{1/2}} \qquad (12)$$

For such a system the damping coefficient $d$ is $$d = \frac{4ph^2 + 1}{2[4p^2h^2 - 1]^{1/2}} \qquad (13)$$

A plot of $d$ for various values of $p$ and $h$ is given in FIG. 11.

In order to adjust the natural frequencies and damping characteristics so that they be substantially independent of the mass of the piston (i.e., the mass 15 or mass 201 or 101), that is substantially independent of the range, I set the value of the suspended mass so that it is of small value compared with the following parameter $$\frac{4A^2 X_t}{w}\left[\frac{(R_s)^2}{(R_s + R_t)^2 + X_t^2}\right] \qquad (14)$$

For practical purposes I set the value of the suspended mass to be less than 10% and preferably less than 5% of the Expression 14 above.

It will be observed that if the above condition is set to be satisfied at any value of $w$ it will be satisfied at all lower values of $w$. For convenience the value of $w$ may be set at the value of the natural frequency $f_n$. $X_t$ refers to the auxiliary passageway.

In the above it has been assumed that the impedance characteristics of the liquid in the restricted orifice is controlled by the orifice dimensions and that the impedance characteristics of the auxiliary passageways are controlled substantially entirely by the dimensions of the auxiliary passageways. By controlled I mean that there are no other passageways present through which liquid flows and whose impedance materially affects either the total impedance to flow of liquid or the respective impedances of the restricted orifice or auxiliary passageways.

Thus if there be any passages which contribute materially to the flow impedance of the gap and auxiliary passageways, they need to be added, with proper attention to sign and phase, to the impedance of the restricted orifice or auxiliary passageway. I prefer for simplicity of design to avoid such additional passageways and, for example, in the design shown in FIGS. 1–9, all other orifices and passageways which are in the flow pattern of the auxiliary orifices are made to have the proper value of "$a$" as described above or such short length, i.e., small value of L as to be of small influence in the values of $f_0$ or B.

Thus, in the devices shown in FIGS. 1 to 4 and 4$a$, the dimensions and volume of the chambers 21 and 22 are made so large that substantially the entire flow impedance is in the peripheral orifice 20 and in the auxiliary passageways, i.e., in the bores 26 and 27 in FIGS. 1 to 3, or in the orifice 20 and bore 33 of FIG. 4, or in 26, 26', 27 and 27' of FIG. 4a, or in slots 28 and 29 and orifice 20 of FIG. 5, and orifice 103 and passageway 106 of FIG. 9 and orifices 206a and passageway 206 of FIG. 7. I make the radius of the bores 26, 26', 27, 27', 33 and 106 and 206 and their respective restricted orifices less than a given range of value, as set by the selection of the value of B, and the width of the slots 28 and 29 less than the given range of values, as described above and also below.

Thus, for example, the slots in the springs 104 and 105 are made of such width and the springs of such thickness so as not to be of material influence in the damping or material frequency of the unit.

If any part of the liquid passageway via chambers 21 and 22 FIGURES 1–5 or 207 and 208 of FIG. 7 or 107 and 108 of FIG. 9 also contributes materially to the flow impedance, the dimensions of the chamber measured transversely to the flow should also be within said range of values. For practical design, the chambers 21 and 22 and 207 and 208 and 107 and 108 are made so large as to add insignificantly to the flow impedance.

FIGURE 11 plots the Equation 13 as a family of curves, the damping ratio "$d$" as a function of "$h$" for different values of "$p$."

The value of "$h$" in each curve where it passes through a minimum value of "$d$," is given in the following expressions:

$$h(\min) = \frac{(p+2)^{1/2}}{2p} \quad (15)$$

The minimum value of "$d$" for various values of "$p$" is given by $$d(\min) = \frac{(p+1)^{1/2}}{p} \quad (16)$$

The following table tabulates the values from Equation 16.

Table 2

| P | d(min) |
|---|---|
| 1 | 1.41 |
| 2 | .87 |
| 3 | .67 |
| 4 | .54 |
| 5 | .49 |
| 8 | .38 |
| 12 | .28 |

Where as is usually desirable in accelerometers, the damping ratio should be less than unity, i.e., the damping should be less than the critical damping, the value of "$p$" should be greater than 1.

For operation at a single temperature "$p$" may be selected so that the desired damping ratio is at the minimum of the curve so that accidental variations in temperature will not affect the damping ratio materially. Thus for practical purposes and in order that the device be not underdamped, I prefer to use a value of $p$ less than 12, to obtain a minimum damping coefficient greater than about .3, and preferably the value of $p$ should be greater than 1, and preferably at least about 2. In such case the viscosity of the oil chosen will give the value of $h$ necessary at this minimum point. For operation over a range of temperature, and in order that the resultant variation in viscosity does not materially change the damping characteristics the value of "$p$" should be chosen, so that the chosen variation in damping ratio lies in the region of the minimum of the curve for the selected value of $p$ (see FIG. 11). However, where the temperature may be controlled so that viscosity of the oil remains constant values of $p$ greater than 12 may be employed by a suitable selection of the value of $h$.

For operations over a wide range in temperature, the higher the value of $p$ the greater the permissible variation of viscosity when the operations are in the range of the minimum damping. The minima are broader the higher the value of "$p$." This will result in the desired stability of the damping ratio with changes in viscosity.

Another useful criteria for the selection of the value of $p$ and $h$ for any desired value of the damping coefficient is that "$p$" and "$h$" should preferably be related as follows:

For systems described above for any given value of $p$, the natural frequency increases as $h$ decreases and the natural frequency becomes infinite when $hp$ equals 0.5. It will be seen that if $hp$ equals .5, $e_{90}$ (Equation 12) and $d$ (Equation 13) go to infinity. If $hp$ is smaller than 0.5, the phase shift is less than 90° at all frequencies, that is, the system does not exhibit a natural frequency as defined herein and may be said to be aperiodic.

The aperiodic system gives an instrument with a gradual diminution in the amplitude as the frequency increases. Where a sharp cut off at high frequency, i.e., an abrupt decrease in amplitude at a chosen high frequency is desired, the instrument should be periodic in nature. For such instruments the $hp$ value should be more than one-half.

However, there may be circumstances where it is desirable to obtain an aperiodic response. The effect of the value of $hp$ on the frequency of response is shown by FIG. 13 in which the function $$\frac{p}{p+1}(e_{90})$$

is plotted against $hp$ (see Equation 12).

The points plotted on FIG. 13 are as follows:

Table 3

| $\frac{p}{p+1}e_{90}$ | $hp$ |
|---|---|
| ∞ | .5 |
| 2.45 | .547 |
| 2.08 | .570 |
| 1.87 | .582 |
| 1.73 | .61 |
| 1.41 | .70 |
| 1.22 | .86 |
| 1.15 | 1.0 |
| 1.09 | 1.22 |
| 1.06 | 1.5 |

It will be seen that for any value of $p$, the frequency changes but by a small percentage with increasing values of $hp$ for values $hp$ of one or more. As $hp$ equals 0.5, the frequency goes to infinity. Thus for practical values of $p$ and $e_{90}$, $hp$ should not be less than about 0.75 and $hp$ equals 1 is a good practical lower limit. The locus of points where $hp=1$ is given in FIG. 11 by the dotted line curve, which marks the boundary for response curves which have satisfactory cut offs (i.e., those values of $h$ and $p$ which lie to the right of the curve) and those which have unsatisfactory cut offs (i.e., those values of $h$ and $p$ which lie to the left of the curve).

By setting $hp$ equal to or greater than unity, I obtain a response curve, i.e., variation of amplitude with frequency on application of a constant accelerating force which gives satisfactory cut off and one in which turbulence in the flow path is inhibited. I will also obtain an instrument with satisfactory linearity.

For systems in which the damping ratio $d$ is less than one, i.e., systems which are not critically damped, as is desirable, for example, in accelerometers, the value of $h$ should be less than 1.

The relationship between the values of $h$ and $Ba$ is also of interest. These values for the configurations of FIGS. 1–9 are related by the following expression $$Ba = \frac{1.22}{(h)^{1/2}} \quad (17)$$

where "B" is measured at the frequency equal to $f_0$, i.e., $e=1$ (Equation 6). Therefore, the above limits for the value of $h$ also specifies the limits for the value of $Ba$.

For values of $h=0.37$ I will obtain values of $Ba=2$ as above.

And "$h$" will have a value of 0.085 when the value of $Ba$, at frequency equal to $f_0$ is 4.2 and a value of 3 at one-half the above frequency.

Thus the optimum value of "$p$" and "$h$" may be obtained from the curves of FIG. 11 for the desired value of the damping ratio. Where the value of $hp$ is taken as at least 0.75 and the value of $p$ at 12, the lower limit for $h$ is equal to about 0.06. Where $hp$ is one and $p$ is 12, the lower limit for $h$ is 0.085. However, if $p$ is increased beyond 12 as described above the lower limit of $h$ is suitably changed in order to obtain $hp$ values within the above limits, for the specific selected parameters involved in the above equations.

Figure 6:
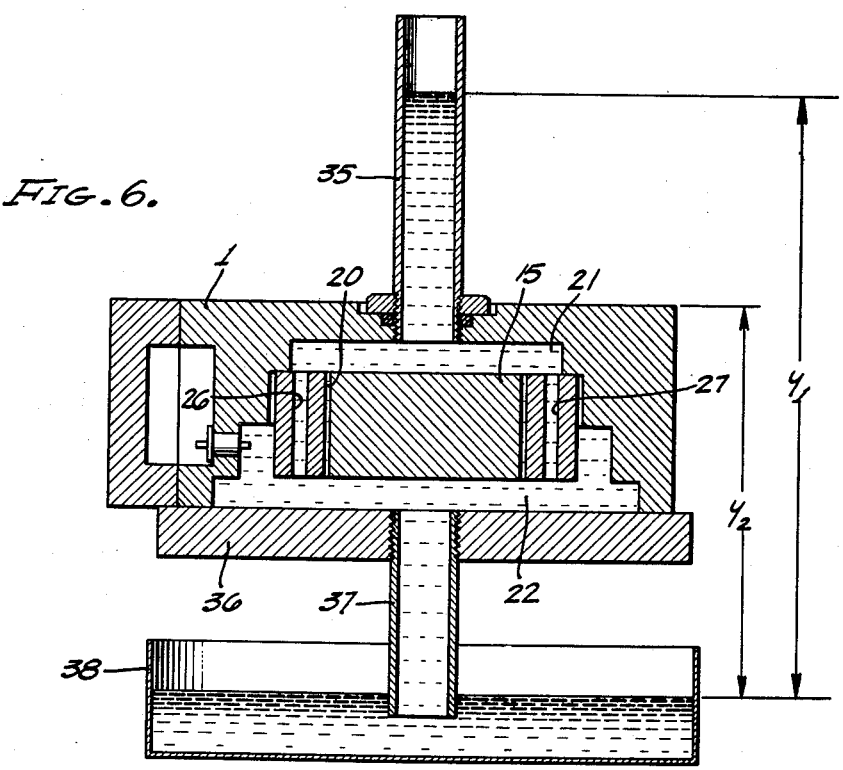
FIG. 6 shows a device for determining the ratio $R_s/R_t$ (see Eq. 11)

FIG. 6 illustrates somewhat schematically a method for determining the value of "$p$." Thus, for example, the bottom 2, the diaphragm 4, and the cover 5 are removed. The fill plug 34 is removed and a tube 35 is screwed in in place of the fill plug and held in place by the nut. The cover 5 is replaced by a plate 36 carrying a tube 37 of equal cross-sectional area (S) axially aligned with 35 and depending into a reservoir 38. The case 1 and tubes 35 and 37 are filled with the liquid to be employed in the instrument and up-ended in the reservoir 38. The time ($t$) for the level of the liquid to fall from a level $y_1$, at a distance to a line $y_2$ is observed.

The resistance to flow either through the orifice or auxiliary passageways is then $$R = \frac{rgt}{S \log \frac{y_1}{y_2}} \quad (18)$$

where $r$ is the density of the liquid and $g$ is the acceleration of gravity.

If the case is large in cross-section relative to the orifice and auxiliary passageways, the above value may then be taken as the resistance to flow through the orifice and through the auxiliary passageways.

The above observation may be made by sealing the ports 28 and 29 of the form of FIG. 5 and 26, 27, 26', 27' and 33 of the forms of the other figures. The experiment is repeated in the above set-up using the same oil viscosity and same levels of $y_1$ and $y_2$ by unsealing the auxiliary passageways and covering up the orifice 20 by a plate or sheet material cemented over the orifice. The ratio of the times gives the value of "$p$."

The above procedure is also applicable to the form of FIG. 9 as will be evident to those skilled in this art.

In the claims the following symbols shall have the following meanings:

$p$ is defined by Equation 10;

$R_s$ is the flow resistance of the restricted orifice and $R_t$ the flow resistance of the auxiliary passageway, when $R_s$ and $R_t$ are each measured according to the procedure explained in connection with FIG. 6;

$A$ is the effective area defined by equation $2a$;

$a$ is the radius or the equivalent radius of the restricted passageway or auxiliary passageway;

$L$ is the length of the auxiliary passageway measured in the direction of flow;

$r$ is the density of the liquid;

$K$ is the spring constant of the constraint on which the mass is hung;

$l$ is the length of the paddle of FIGS. 1–5 measured from the hinge area to the free end of the paddle;

$K_1$ is the moment of torsion of the springs and wires of the form of FIGS. 1–5;

$X_t$ is the reactance portion of the impedance of the auxiliary passageway as given in Equation $3a$;

$w$ is the angular frequency at which the device is oscillated;

$B$ is defined by Equation 4;

$f_0$ is defined by Equation 2. "$h$" is a parameter chosen from the group consisting of the parameters "$h$" as defined by Equations 9, 11 and 17.

All units are in the centimeter-grams-seconds (c.g.s.) system.

While I have described my invention as employing an electrical resistance strain gage, any other motion sensing element, such as an electromagnetic or capacitance or an optical sensing element, may be employed to sense the motion of the paddle. Such devices are well known for similar use in the prior art.

I claim:

1. A motion sensing device comprising a case, a piston in said case, said piston being movably mounted in said case upon a spring, an orifice from one side of said piston to the other side of said piston providing a liquid passageway, an auxiliary passageway from one side of said piston to the other side of said piston, liquid in said case and in each of said passageways and means to sense the motion of said piston, where "$hp$" is at least one, where $h$ is defined as follows:

$$h = \frac{R_t}{2}\left[\frac{A^2 l^2 w}{K_1 X_t}\right]^{1/2}$$

where $w$ is the natural angular frequency.

2. A motion sensing device comprising a case, a piston in said case, said piston being movably mounted in said case upon a spring, an orifice from one side of said piston to the other side of said piston providing a liquid passageway, an auxiliary passageway from one side of said piston to the other side of said piston, liquid in said case and in each of said passageways and means to sense the motion of said piston in which "$hp$" is at least one, where $h$ is defined as follows:

$$\frac{2Au}{a^3}\left[\frac{3L}{\pi r K}\right]^{1/2}$$

in which "$a$" refers to said auxiliary passageway.

3. In the device of claim 2, in which the value of "$p$" is at least about 1 and not greater than about 12.

4. A motion sensing device comprising a case, a piston in said case, said piston being movably mounted in said case upon a spring, an orifice from one side of said piston to the other side of said piston providing a liquid passageway, an auxiliary passageway from one side of said piston to the other side of said piston, liquid in said case and in each of said passageways and means to sense the motion of said piston in which said auxiliary passageway has a dimension which satisfies the following expression, to wit:

$$Ba < 7$$

where $B$ is evaluated at $f_0$.

5. In the device of claim 4 in which $Ba$ is less than 2 and $B$ is evaluated at $f_0$.

6. In the device of claim 4 in which $p$ is not more than 12.

7. In the device of claim 4 in which the piston is a paddle connected at one end to a spring in which $$h = \frac{R_t}{2}\left[\frac{A^2 l^2 w}{K_1 X_t}\right]^{1/2}$$

where $w$ is the natural angular frequency.

8. In the device of claim 4 in which the value of "$hp$" is at least 0.75, where "$h$" is defined as follows:

$$h = \frac{2Au}{a^3}\left[\frac{3L}{\pi r K}\right]^{1/2}$$

in which "$a$" refers to said auxiliary passageway.

9. In the device of claim 8 in which $Ba$ has a value less than 2 and $B$ is evaluated at $f_0$.

10. In the device of claim 8 in which "$h$" has a value greater than .06.

11. In the device of claim 10 in which $Ba$ has a value less than 2 and $B$ is evaluated at $f_0$.

12. In the motion sensing device comprising a case, a member mounted in said case, a constraint connected to said member and said case to constrain the motion of said member in said case, a liquid in said case, said member immersed in said liquid, a restricted orifice in said case, and an auxliary passageway in said case adapted to permit flow of liquid in said orifice and passageway on oscillation of said case in space, the parameters of the device at the natural frequency "$w$" having values such that the value of the static mass is less than 10% of the value given by the following ratio:

$$\frac{4A^2 X_t}{w}\left[\frac{(R_s)^2}{(R_s+R_t)^2+X_t^2}\right]$$

and means to sense the motion of said member.

13. A motion sensing device comprising a case, a piston in said case, said piston being movably mounted in said case upon a spring, an orifice from one side of said piston to the other side of said piston providing a liquid passageway, an auxiliary passageway from one side of said piston to the other side of said piston, liquid in said case and in each of said passageways and means to sense the motion of said piston, and in which the value of "$hp$" is more than 0.5.

14. In the motion sensing device of claim 13, in which $$Ba<7$$

where B is evaluated at $f_0$.

15. In the device of claim 13, in which $$Ba<2$$

where B is evaluated at $f_0$.

16. A motion sensing device comprising a case, a piston in said case, said piston being movably mounted in said case upon a spring, an orifice from one side of said piston to the other side of said piston providing a liquid passageway, an auxiliary passageway from one side of said piston to the other side of said piston, liquid in said case and in each of said passageways and means to sense the motion of said piston, and in which "$hp$" is at least 1.

17. In the device of claim 16, in which $$Ba<7$$

where B is evaluated at $f_0$.

18. In the device of claim 16, in which $$Ba<2$$

where B is evaluated at $f_0$.

19. In the device of claim 13, in which $p$ is at least 1.

20. In the device of claim 19, in which B$a$ is less than 7 and B is evaluated at the value $f_0$.

21. In the device of claim 19, in which B$a$ is less than 2 and B is evaluated at the values of $f_0$.

22. In the device of claim 16, in which $p$ is at least 1 and not more than 12.

23. In the device of claim 22, in which B$a$ is less than 7 and B is evaluated at the value of $f_0$.

24. In the device of claim 22, in which B$a$ is less than 2 and B is evaluated at the value of $f_0$.

References Cited in the file of this patent

UNITED STATES PATENTS

| | | |
|---|---|---|
| 2,332,994 | Draper et al. | Oct. 26, 1943 |
| 2,387,223 | Carson | Oct. 16, 1945 |
| 2,453,548 | Statham | Nov. 9, 1948 |
| 2,942,474 | Statham | June 28, 1960 |